US011422756B1

(12) United States Patent
Manalo

(10) Patent No.: US 11,422,756 B1
(45) Date of Patent: Aug. 23, 2022

(54) SYSTEM FOR MONITORING AND RECOVERING FUNCTIONS OF PRINTING DEVICES AND A MANAGING SERVER

(71) Applicant: Kyocera Document Solutions Inc., Osaka (JP)

(72) Inventor: Manuel Aralar Manalo, Fort Lee, NJ (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/374,298

(22) Filed: Jul. 13, 2021

(51) Int. Cl.
| | |
|---|---|
| *G06F 15/00* | (2006.01) |
| *G06F 1/00* | (2006.01) |
| *G06K 15/00* | (2006.01) |
| *G06F 3/12* | (2006.01) |
| *H04L 41/0681* | (2022.01) |
| *G16Y 40/10* | (2020.01) |
| *H04L 41/0654* | (2022.01) |
| *H04N 1/00* | (2006.01) |

(52) U.S. Cl.
CPC .......... *G06F 3/1217* (2013.01); *G06F 3/1204* (2013.01); *G06F 3/1225* (2013.01); *G06F 3/1236* (2013.01); *G06F 3/1254* (2013.01); *G16Y 40/10* (2020.01); *H04L 41/0672* (2013.01); *H04L 41/0681* (2013.01); *H04N 1/00973* (2013.01); *G06F 3/1288* (2013.01)

(58) Field of Classification Search
CPC .... G06F 3/1217; G06F 3/1204; G06F 3/1225; G06F 3/1236; G06F 3/1254; G06F 3/1288; H04L 41/0672; H04L 41/0681; H04N 1/00973
USPC .............................. 358/1.14, 1.15, 1.13, 1.1
See application file for complete search history.

(56) References Cited

U.S. PATENT DOCUMENTS

| | | | |
|---|---|---|---|
| 2016/0209899 A1 | 7/2016 | Brantner et al. | |
| 2018/0349071 A1* | 12/2018 | Nakamura | ............ G06F 3/1292 |
| 2020/0117402 A1* | 4/2020 | Morishita | .......... H04N 1/00307 |
| 2020/0269593 A1* | 8/2020 | Nishiyama | ........... B41J 2/17566 |

* cited by examiner

*Primary Examiner* — Douglas Q Tran
(74) *Attorney, Agent, or Firm* — Millen, White, Zelano & Branigan, P.C.; William Nixon

(57) ABSTRACT

A printing system uses an IoT technology to control and monitor a multiple printing devices. Each of the multiple printing devices is equipped with an IoT-controlled power supply. A monitoring device is disclosed that couples with the server and can be part of the server or a separate device from the server. The monitoring device monitors the statuses of the sever, the multiple printing devices, and the multiple IoT-controlled power supplies and send an alert signal to the server when detecting an offline situation. In response, the server diagnoses and determines which printing devices are offline and triggers a recovering device to recover a connection between the offline printing devices and the server. The recovering device may use a controller firmware of the offline printing device to perform the connection.

20 Claims, 5 Drawing Sheets

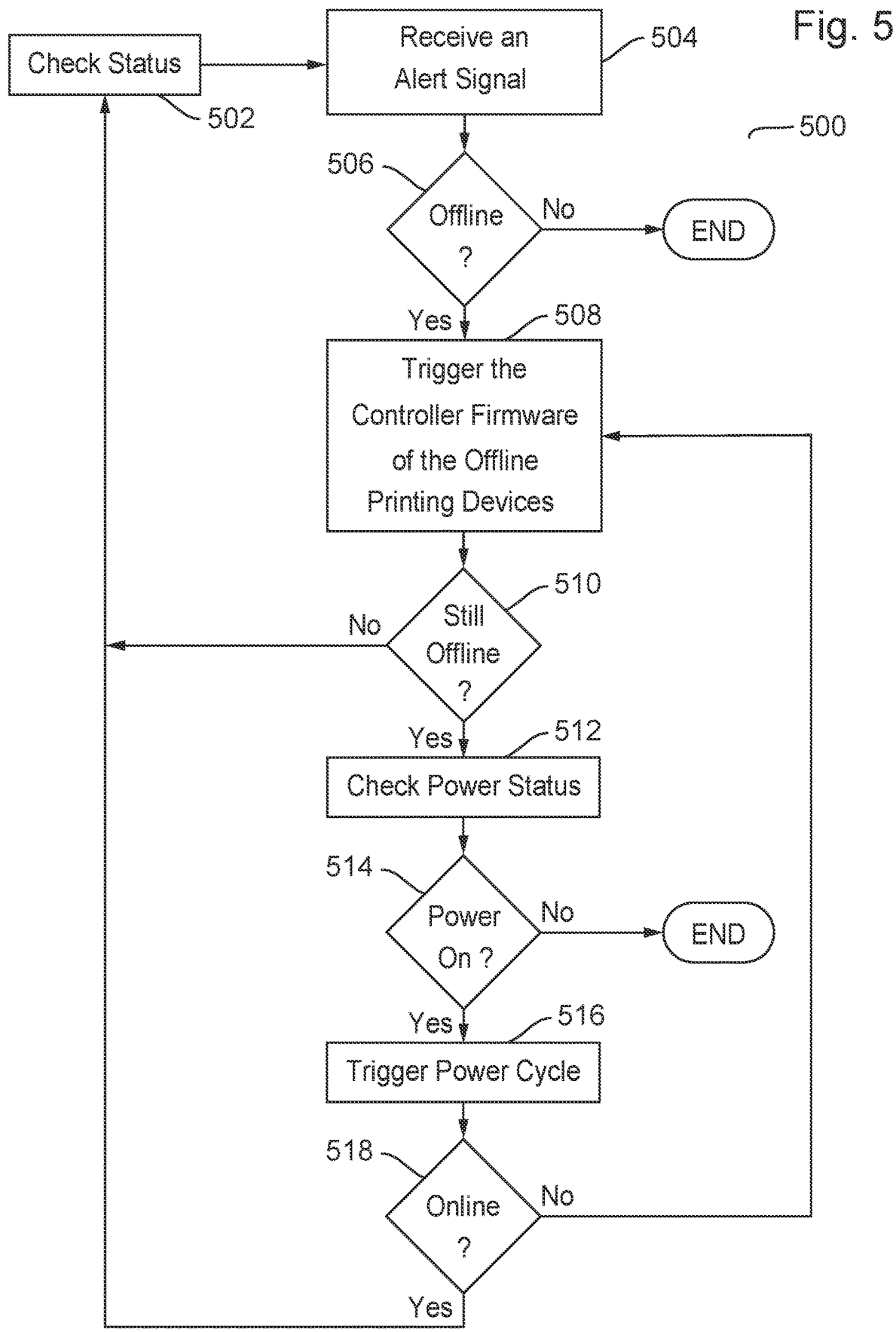

SYSTEM FOR MONITORING AND RECOVERING FUNCTIONS OF PRINTING DEVICES AND A MANAGING SERVER

FIELD OF THE INVENTION

The present invention relates to a system of printing devices that implements an Internet of Things (IoT) technology to manage print jobs and to recover operations of printing devices after an offline event occurs.

DESCRIPTION OF THE RELATED ART

In a printing system comprised of a plurality of printing devices of which printing features are controlled by a managing server through an internet, printing devices are required to be online at all times. When an error of a printing device occurs, such as printing operation stops, and the printing device is online, the managing server may be able to diagnose the problem remotely and made alternative solutions. However, when an error, such as an offline, occurs, traditionally, the managing server would usually dispatch a technician to a customer's location to diagnose and repair a problem on the printing system. Some systems may notify the error to the user so that the user can act on the error to resolve it. However, these reaction-type processes creates additional down-time for the printing device. It also creates more wasted time for the user, especially in a print-heavy environment such as production printing, because the user reacts to the media-caused error created by the current print job.

SUMMARY OF THE INVENTION

A system for monitoring and controlling at least one printing device via a network is disclosed. The system comprises a server that connects wirelessly with at least one printing device to send/receive data to/from the at least one printing device. The at least one printing device is equipped with an IoT-controlled power supply that is accessible by the server, and the server is configured to recover a function of the at least one printing device when an offline situation occurs at the at least one printing device.

A monitoring device is disclosed for monitoring statuses of the server, the at least one printing device, and the IoT-controlled power supply, and for sending an alert signal to the server when an offline signal is detected. A diagnosing device is used for testing the server, the at least one printing device, and the IoT power supply to diagnose which printing device among the at least one printing device is offline. Afterward, a recovering device re-connects the offline printing device with either the IoT-controlled power supply or the server until the offline printing device is back online or until a predetermined condition is met.

The predetermined condition includes a number of re-connecting attempts and a predetermined period of time required to reconnect the offline printing device with the server or the IoT-controlled power supply, and the time of day when the offline situation occurs A method for auto-reconnecting at least one printing device to a server when the at least one printing device is at an offline status is also disclosed. The method comprises monitoring the statuses of the at least one printing device, at least one IoT-controlled power supply, and the server, wherein the server connects wirelessly with the at least one printing device via a network and each of at least one printing device is equipped with an IoT-controlled power supply; detecting an offline signal when the at least one printing device is offline, and sending the offline signal to the server; diagnosing the server, the at least one printing device and the at least one IoT-controlled power supply to determine which of the least one printing device is offline; and re-connecting the offline printing device to the server until the status of the offline printing device changes to an online status or if a certain condition is met.

The re-connecting may be executed by a controller firmware of the offline printing device. The controller firmware is installed to the at least one printing device by the server when the at least one printing device is subscribed to the server. Further, if the offline printing device fails to change to an online status by the controller firmware after a number of attempts and a power is on, the method will reconnects the offline printing device by triggering a hardware power cycle (on/off) at a predetermined time.

A server device for wirelessly auto-recovering, via a network, a multiple-functional printing system that includes a multiple printing devices is further disclosed. The server device comprises a monitoring unit for monitoring statuses of the multiple printing devices and a multiple IoT-controlled power supplies and for sending an offline signal to the server device when an error signal is detected. Each of the multiple printing devices is equipped with an IoT-controlled power supply and the multiple printing devices are registered devices of the server device.

The server device further comprises a diagnosing unit for testing the printing device and the IoT power supply to diagnose which printing devices are offline, and a recovering unit for re-connecting the offline printing devices to the server until the error is solved or if a certain condition is met.

BRIEF DESCRIPTION OF THE DRAWINGS

Various other features and attendant advantages of the present invention will be more fully appreciated when considered in conjunction with the accompanying drawings.

FIG. 5 illustrates a flowchart of re-connecting printing devices to a managing server in accordance with the disclosed embodiments.

DETAILED DESCRIPTION OF THE PREFERRED EMBODIMENTS

Figure 1:
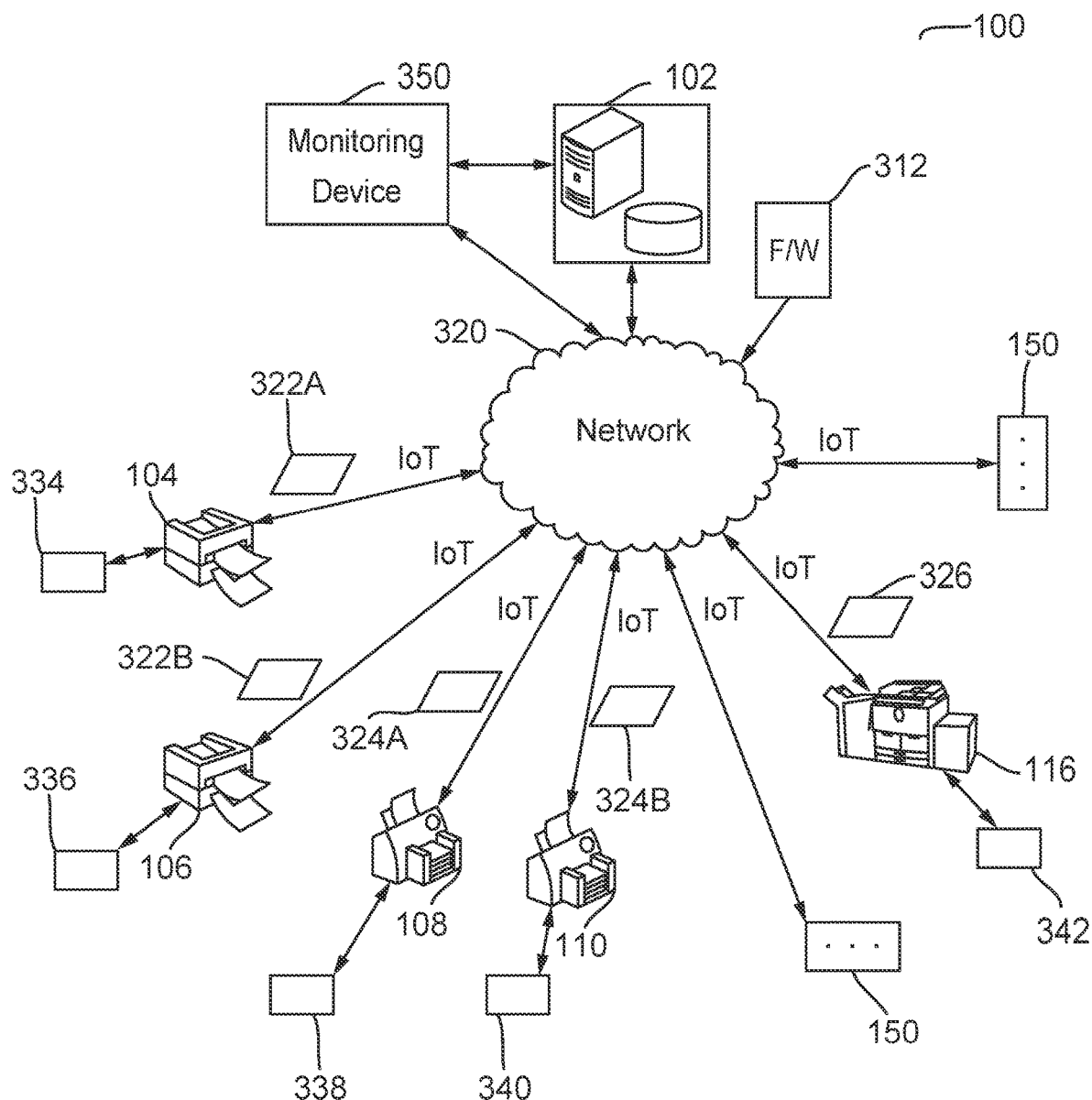
FIG. 1 illustrates a block diagram of a printing system of a plurality of printing devices for controlling and monitoring printing performances of the plurality of printing devices according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments include a printing system that subscribes to a wireless server system and is supplied with an internet controller device compatible to the wireless server system so as to provide an internet/public cloud-based printing system management solution with remote maintenance capability. In the disclosed embodiments, solutions and preventive measures can be performed remotely and securely from the server's location, without sending a technician. This results in reduction of device downtime, increasing customer satisfaction and decreasing the server's overall service cost.

IoT (The internet of Things) technology has been introduced and used in connecting various network or physical objects ("things") for the purpose of connecting and exchanging data with other devices and systems over the internet without requiring human-to-human or human-to-computer interaction. The disclosed embodiments use the IoT technique to control and monitor a number of subscribed printing devices in a printing system to eliminate a human or a technician interaction with the printing devices in the printing system. The printing system of the disclosed embodiments may include a plurality of printing devices. With the plurality of printing devices registered to a provider server, solutions and preventive measures can be performed remotely and securely from the service provider's location, without sending a technician. To be able to use remote maintenance functionality on a specific printing device, the specific printing device needs to be in an online state. In an event when the printing system goes down (even for a few minutes only), it may trigger a significant amount of online printing devices to go offline. In accordance with the disclosed embodiments, the printing devices are equipped with IoT controllers and controller firmware that includes a functionality to retry a connection to a managing server on its own. For those devices that are not equipped with controller firmware, the printing devices that go offline may retry the connection to the managing server with manual intervention. This typically involves a person physically turning off the device and turning it back on. Alternatively, the disclosed embodiments may update the firmware of the printing device to be newest firmware that is capable of conducting a retry connection to the managing server on its own. Details of the disclosed embodiment will be described below.

FIG. 1 depicts a block diagram of a printing system 100 of a plurality of printing devices, such as printing devices 104-116 coupled to printing system managing server 102 that monitors and updates statuses of the plurality of printing devices based on information received therefrom according to the disclosed embodiments. System 100 includes printing devices 104-116 and additional printing devices 150 connected to managing server 102 via network 320. Printing devices 104 and 106 may be similar device models, while printing devices 108 and 110 also may be similar device models that differ from printing devices 104 and 106. Printing device 116 may be a different model altogether. Additional printing devices may be associated with the different models. Further, system 100 may include additional models of printing devices not shown here for brevity.

System 100 further includes monitoring device 350 that couples with printing devices 104-116 via network 320. Monitoring device 350 also connects with managing server 102. Monitoring device 350 is adapted to monitor statuses of printing devices 104-116 and managing server 102. FIG. 1 illustrates that monitoring device 350 is a separate device from managing server 102 and is an internet/public cloud-based device. However, in alternative embodiments, monitoring device 350 may also be part of managing server 102. That is, managing server 102 may have functions of monitoring statuses of the plurality of printing devices 114-116.

The disclosed embodiments adapts IoT technology to managing printing devices 104-116. In order that printing devices 104-116 perform in an IoT technological environment, each of printing devices 104-116 is equipped with an IoT controller (280 in FIG. 2) an IoT-controlled power supply 334, 336, 338, 340, and 342. Also, printing devices 104-116 are registered devices with managing server 102. Monitoring device 350 monitors the statuses of managing server 102, printing devices 104-116 and the statuses of IoT-controlled power supply 334-342. When an offline or an alert signal is detected by monitoring device 350, monitoring device 350 sends an alert signal to managing server 102 for further action. Details of the disclosed embodiments will be described below.

A given printing device may be configured to perform one or more functions such as printing, scanning, emailing, storing, modifying, receiving, or transmitting one or more documents or files. In some embodiments, each printing device may include hardware and software components associated with a firmware package. Firmware may refer to packages of software installed on embedded devices. Each firmware may include a version for the different packages for the components within the printing device. A version of firmware, or firmware 312, may be sent from managing server 102 to one or more printing devices within system 100.

Each printing device 104, 106, 108, 110, . . . , 116, and 150 may be configured to perform one or more steps, actions, or functions disclosed herein. For example, printing device 104 may communicate with managing server 102 to transmit or receive data, or information, 322A via network 320, including error codes, print counter values, time stamps, error intervals, mean time between failures (MTBF), error frequency codes, time intervals, numbers of printed pages, numbers of errors, print volume, remaining numbers or percentage of papers in paper cassettes, paper sizes in paper cassettes, toner levels, and other related information. Each printing device may send and receive its own data packages, as shown in FIG. 1. Data may be routed within system 100 using a protocol, such TCP/IP, in that each device includes its own unique network address. Thus, printing device 106 may transmit or receive data 322B, printing device 108 may transmit or receive data 324A, printing device 104B may transmit or receive data 324B, printing device 116 may transmit or receive data 326, and so on.

Managing server 102 may include a cloud-based server, for example, that can perform one or more tasks to manage or maintain printing devices within system 100. Managing server 102 may communicate with printing devices 104, 106, 108, 110, 116, and 150 to transmit and receive data. Managing server 102 also may install firmware 312 on one or more of the printing devices. In some embodiments, managing server 102 may transmit a command to one or more of the printing devices to reset, install updates, or perform one or more printing or maintenance functions or operations. In other embodiments, managing server 102 may receive data from one or more printing devices, shown as data 322A-326, such as error codes, print counter values, time stamps, error intervals, mean time between failures (MTBF), error frequency codes, time intervals, numbers of printed pages, remaining papers and paper sizes stored in paper cassettes, numbers of errors, print volume, and other related information.

Managing server 102 may be configured to perform one or more functions to determine whether to upgrade one or more printing devices with firmware 312. Firmware 312 may represent a version of firmware that may be used to replace one or more firmware packages on a set of printing devices. For example, firmware 312 may include an IoT controller firmware package and firmware 312 may be used to upgrade every printing device in system 100 or only a group of printing devices, such as devices 104 and 106 having the same model. Managing server 102 performs the analysis of incoming data from the printing devices to determine whether to upgrade them with firmware 312. As noted above, firmware 312 may be a firmware package corresponding to only a part of the printing device, such as main, network, or image processing. Failure rates and other information provided by the printing devices determines how or if the upgrade to firmware 312 will be sent or installed.

Managing server 102 may include one or more computing devices or systems. It also may be consolidated into a single physical location or distributed across two or more physical locations. Managing server 102 may include hardware, software, or firmware configured to perform one or more functions disclosed below.

Network 320 in system 100 may include one or more wired or wireless connections that support communication between the devices of system 100. In some embodiments, network 320 may support one or more communication protocols, such as Extensible Messaging and Presence Protocol (XMPP), File Transfer Protocol (FTP), HyperText Transport Protocol (HTTP), Java Message Service (JMS), Simple Object Access Protocol (SOAP), Short Message Service (SMS), Simple Mail Transfer Protocol (SMTP), Simple Network Management Protocol (SNMP), Transmission Control Protocol/Internet Protocol (TCP/IP), User Datagram Protocol (UDP), Lightweight Directory Access Protocol (LDAP), and the Message Queue (MQ) family of network protocols.

Network 320 is configured to allow communication between managing server 102 and one or more printing devices within system 100, between the printing devices themselves, or between one or more other devices or systems and system 100. Such communications may include commands, requests, or data corresponding to documents, printing-device errors, or other data.

Figure 2:
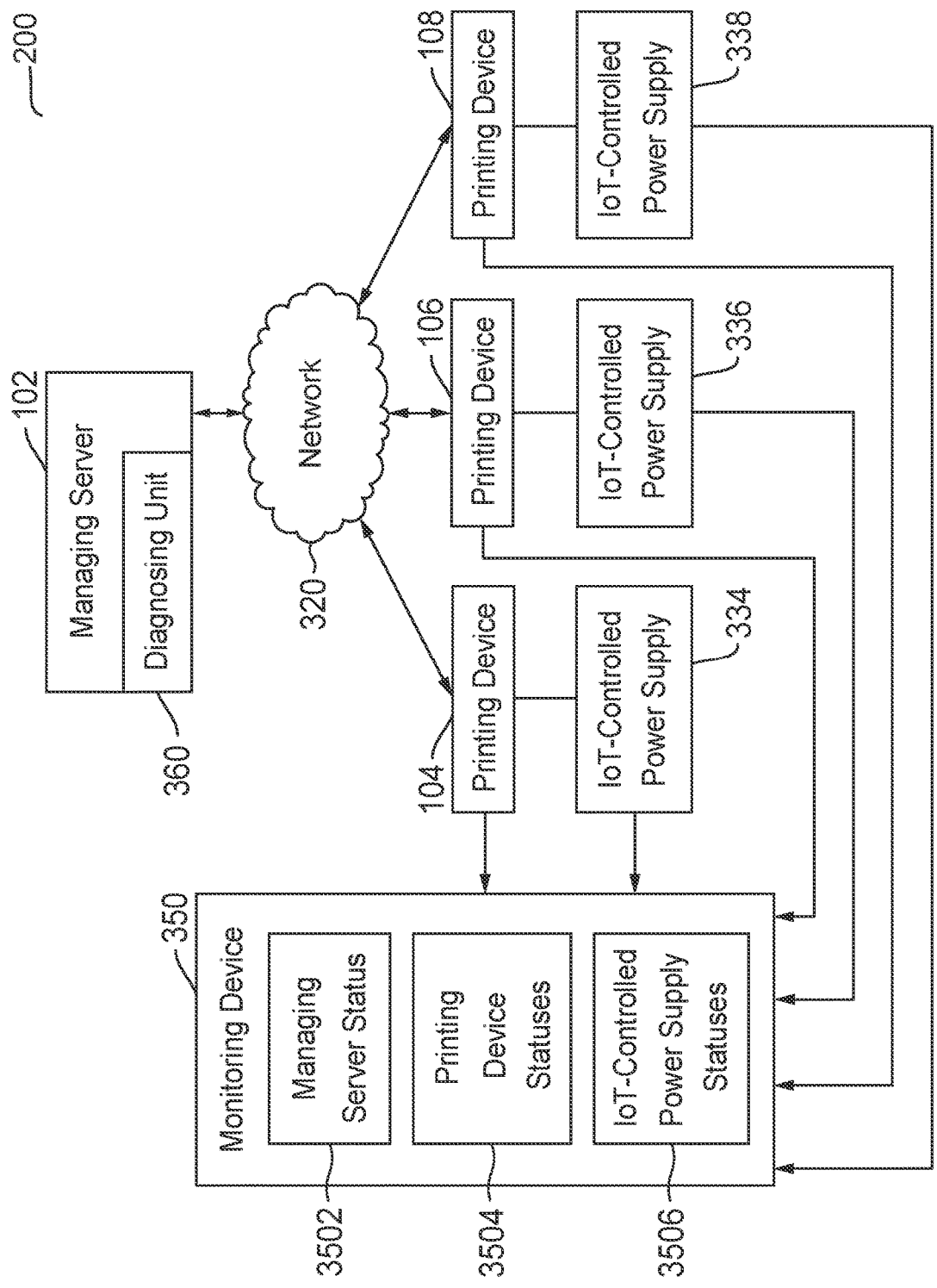
FIG. 2 illustrates a block diagram of a printing system of a plurality of printing devices using a managing server and a monitoring device to control and monitoring statuses of the managing server and the plurality of printing devices.

More details of printing system 100 of FIG. 1 are depicted in FIG. 2. In FIG. 2, only printing devices 104, 106, and 108 are illustrated in printing system 100 for brevity. Additional printing devices may be included in printing system 100. Alternatively, fewer printing devices may be utilized. As described above with reference to FIG. 1, printing devices 104-108 are connected over a network within system 100 to a printing system managing server 102. Managing server 102 may store information and data pertaining to the different printing devices. Managing server 102 also may collect this information and make decisions regarding the workflow and error priority of the printing device in system 100. An exemplary printing device is disclosed in a greater detail by FIG. 3. Exemplary device information stored in managing server 102 for each printing device may include firmware information, printing history information, print volume history information, paper trays information, ink toner information, warnings, errors, print job information, rules, and so on.

In accordance with the disclosed embodiments, each of the plurality of printing devices 104-108 is equipped with IoT-controlled power supply 334, 336, and 338. The printing devices 104-108 may be registered with system 100 that uses the IoT technology. The disclosed embodiments aim to monitor statuses of printing devices 104-108 and IoT-controlled power supply 334-338 using monitoring device 350 that couples with managing server 102 and sends alert signals to managing server 102 when an abnormal circumstance occurs. As shown in FIG. 2, monitoring device 350 monitors and saves managing server status 3502, printing devices statuses 3504, and IoT-controlled power supplies statuses 3506. Based on the monitored statuses, when an abnormal condition occurs (such as offline, printing operation stops, paper jams, etc.), monitoring device 350 sends alert signals to managing server 102. Upon receiving the alert signals, managing server 102 diagnoses (using diagnosing unit 360) the statuses of printing devices 104-108 and IoT-controlled power supplies to determines the problems of printing devices 104-108 and takes actions to repair the abnormality. Diagnosing unit 360 may be a software installed in managing server 102. Monitoring device 350 may also monitor the status of managing server 102. As shown in FIG. 2, monitoring device 350 of the disclosed embodiments may monitor, but not limited to, 1) managing server 102 status; 2) connection state of a registered printing device with its IoT-controlled power supply; and 3) power status of a registered printing device with IoT-controlled power supply. It is noted that the above monitoring features are exemplary. Other monitoring features, such as monitoring the printing operations, a paper tray, an ink toner lever of the printing devices 104-108 may also be performed by monitoring device 350. Moreover, monitoring device 350 may be included in managing server 102. That is, managing sever 102 may include same functions as performed by monitoring device 350.

Once a printing device is registered to system 100, managing server 102 downloads a control firmware package that allows the printing device to auto-recover its connection with its IoT-controlled power supply or with managing server 102. Thus, when an offline of a printing device occurs, managing server 102 may trigger an auto-recovery sequences for the control firmware of the printing device to perform auto-recovery action. The disclosed embodiments work by simulating the action of a person physically pushing the power switch, without actually dispatching a technician to the client site, to establish a new connection of a client printing device with a provider managing server. Thus, the uptime of repairing an outage can be kept as fast as possible.

Managing server 102 also may communicate with the various printing devices to collect information, such as printing job list, paper size/quality/number required for a printing job, statistic records of the printing performance, etc., to provide management of print jobs within printing system 100 according the disclosed embodiments. The information collected from various printing devices may be stored as an entry for each printing device.

Print jobs may be received by printing system 100. In some embodiments, managing server 102 may determine which printing device receives each print job. For example, managing server 102 may determine that printing device 104 does not receive every print job received in the printing system. Further, a print job may specify a certain type of paper or media type that is only available on certain printing devices. For example, a print job may require the use of A4 sized paper, which is only available on printing device 106 and 116. Thus, it would make no sense to send this print job to printing device 108, which only processes print jobs using letter sized paper.

In addition to managing print jobs based on capabilities of the printing device, the disclosed embodiments also manage print jobs according to device status information, pending job information, error information, warning information, and historical information from each of the printing devices within printing system 100.

Figure 3:
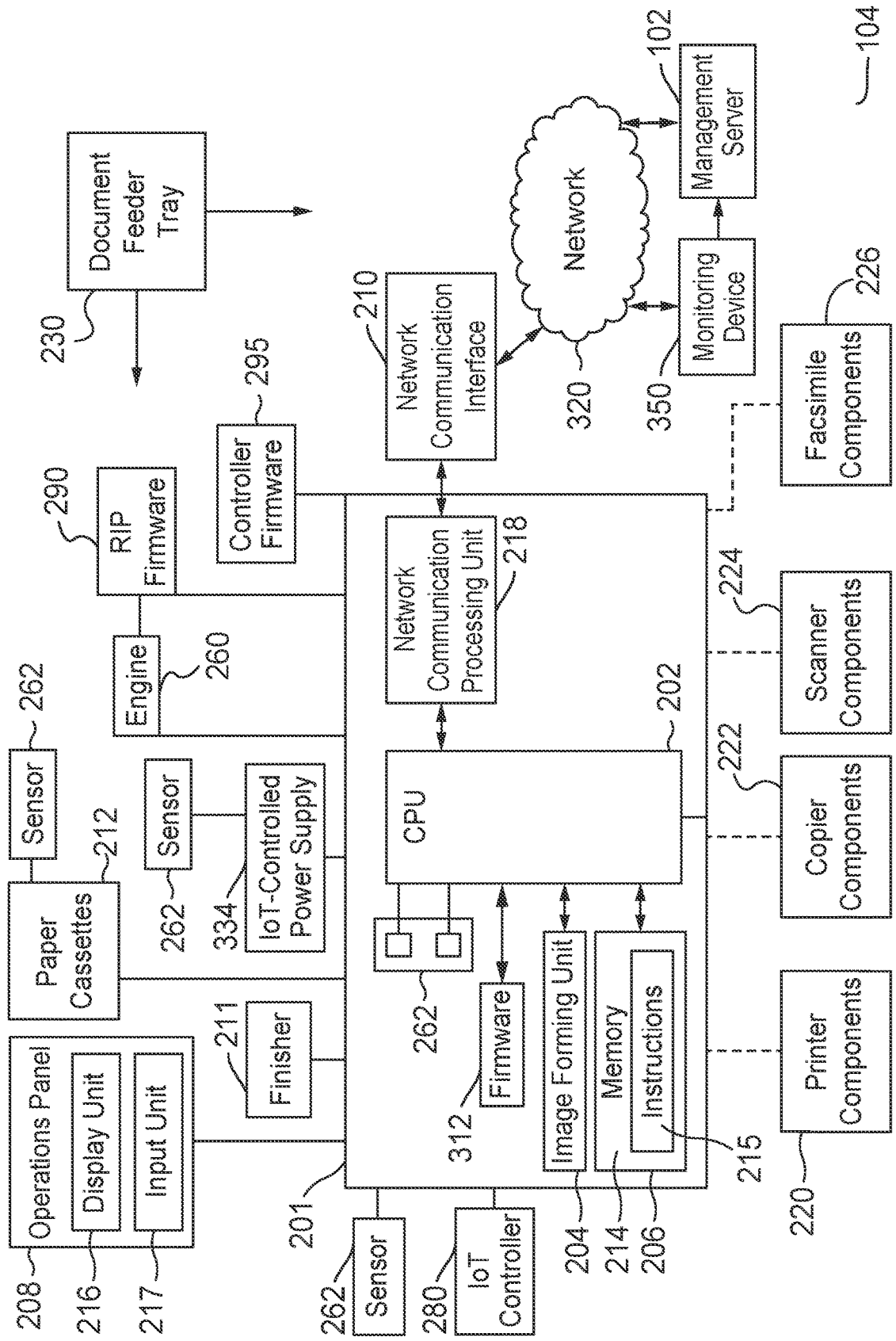
FIG. 3 illustrates a block diagram of components of a printing device according to the disclosed embodiments.

FIG. 3 depicts a block diagram of components of a printing device according to the disclosed embodiments. In the disclosure of FIG. 3, printing device 104 may be referred to for illustrative purposes. The architecture shown in FIG. 3 may apply to any multi-functional printing device or image forming apparatus that performs various functions, such as printing, scanning, storing, copying, and the like within printing system 100. As disclosed above, an IoT power supply 334 is connected with printing device 104. Monitoring device 350 is also coupled with printing device 104 via a network that keeps tracks of a connection status between printing device 104 and IoT-controlled power supply and power statuses of printing device 104 and IoT-controlled power supply 334. Further, a controller firmware 295 is loaded into printing device 104 by managing server 102 when printing device 104 subscribes IoT service to system 100. In addition, an IoT controller 280 is coupled with printing device 104.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a cassette. Finisher 211 also may perform additional actions, such as sorting the finished papers, binding sheets of papers with staples, doubling, creasing, punching holes, folding, and the like. Paper cassettes 212 supply paper to image the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder cassette 230 may be the physical components of printing device 104 to receive papers and documents to be processed. A document is placed on or in document processor input feeder cassette 230, which moves the document to other components within printing device 104. The movement of the document from document processor input feeder cassette 230 may be controlled by the instructions input by the user. For example, the document may move to a scanner flatbed for scanning operations. Thus, document processor input feeder cassette 230 provides the document to scanner components 220. As shown in FIG. 2, document processor input feeder cassette 230 may interact with engine firmware 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using a network, such as a wireless or wired connection with one or more other image forming apparatuses or managing server 102. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the toner onto paper during operations on printing device 104.

In some embodiments, managing server 102 may send updates to firmware on printing device 104. Thus, engine 260 or RIP firmware 290 may be updated by a firmware, for example, firmware 312, which is a more recent version of the firmware installed on printing device 104. The installation of the new firmware version, however, may result in additional errors or degradation of performance of printing device 104. In this instance, printing device 104 may not install firmware 312.

To this end, printing device 104 may include one or more sensors 262 (only three are shown in the figure for brevity) that collect data and information to provide to computing platform 201 or CPU 202. Each sensor 262 may be used to monitor certain operating conditions of printing device 104. Sensor 262 may be used to monitor the status of IoT-controlled power supply 334. Sensors 262 may be used to indicate a location of a paper jam, failure of hardware or software components, broken parts, operating system problems, document miss-feed, toner level, number of papers remained in the paper cassettes, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code. Computing platform 201 may transmit the error alert along with the error code to monitoring device 350 and/or managing server 102. Further, sensors 262 may detect the paper size, a percentage of paper remained, a toner level and so on, and send the detection results to computing platform 201. Computing platform 201 in turns sends the results to managing server 102 upon request or automatically.

Display unit 216 may display information about applicable error codes and a short description of the error associated with the operational issue or failure event. Further, display unit 216 may display an instruction on how to proceed (operate) to resolve the error. For example, if a network error occurred, then the following message may be provided on operations panel 208: Reboot the device.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. The history of failure events may be sent via network communication interface 210 to managing server 102 for statistical purpose. Printing device 104 communicates with managing server 102 via network communication interface 210 by utilizing a network protocol. In some embodiments, printing device 104 communicates with managing server 102 through REST API, which allows the server to collect data from multiple devices via network 320 (shown in FIG. 3). REST API and SOAP are application protocols used to submit data in different formats, such as files, XML messages, JSON messages, and the like. By utilizing applicable network communication protocols and application protocols, printing device 104 submits the applicable error code or codes to managing server 102. Managing server 102 collects error codes and data from individual devices, stores information in the database for further analysis, and creates information data entries for individual printing devices. The data stored in the database includes device identification, timestamp, error code, remaining number or percentage of papers, paper size, and the like.

According to preferred embodiments of the present invention, monitoring device 350 tracks statuses of IoT-controlled power supply 334 and connection of IoT-power supply 295 with printing device 104. Once an abnormal condition is detected, for example, the IoT-controlled power supply 334 is not connected or printing device is offline, monitoring device 350 sends an alert signal to managing server 102. In response to the alert signal, managing server 102 triggers controller firmware 295 to re-connect the IoT-controlled power supply 295 with printing device 104 (if the connection therebetween is disconnected) or re-connect printing device 104 with managing server 102 (if printing device 104 is offline.) When a multiple printing devices are presented, upon receiving an alert signal, diagnosing unit 360 diagnose statuses of the multiple printing devices, the IoT-controlled power supplies, and the managing server 102 to determine which one or ones among the multiple printing devices is/are offline. Afterward, managing server 102 triggers the controller firmware of the offline printing devices to re-connect the offline printing devices with managing server 102. Such re-connections will be described in more details with reference to FIG. 4.

Figure 4:
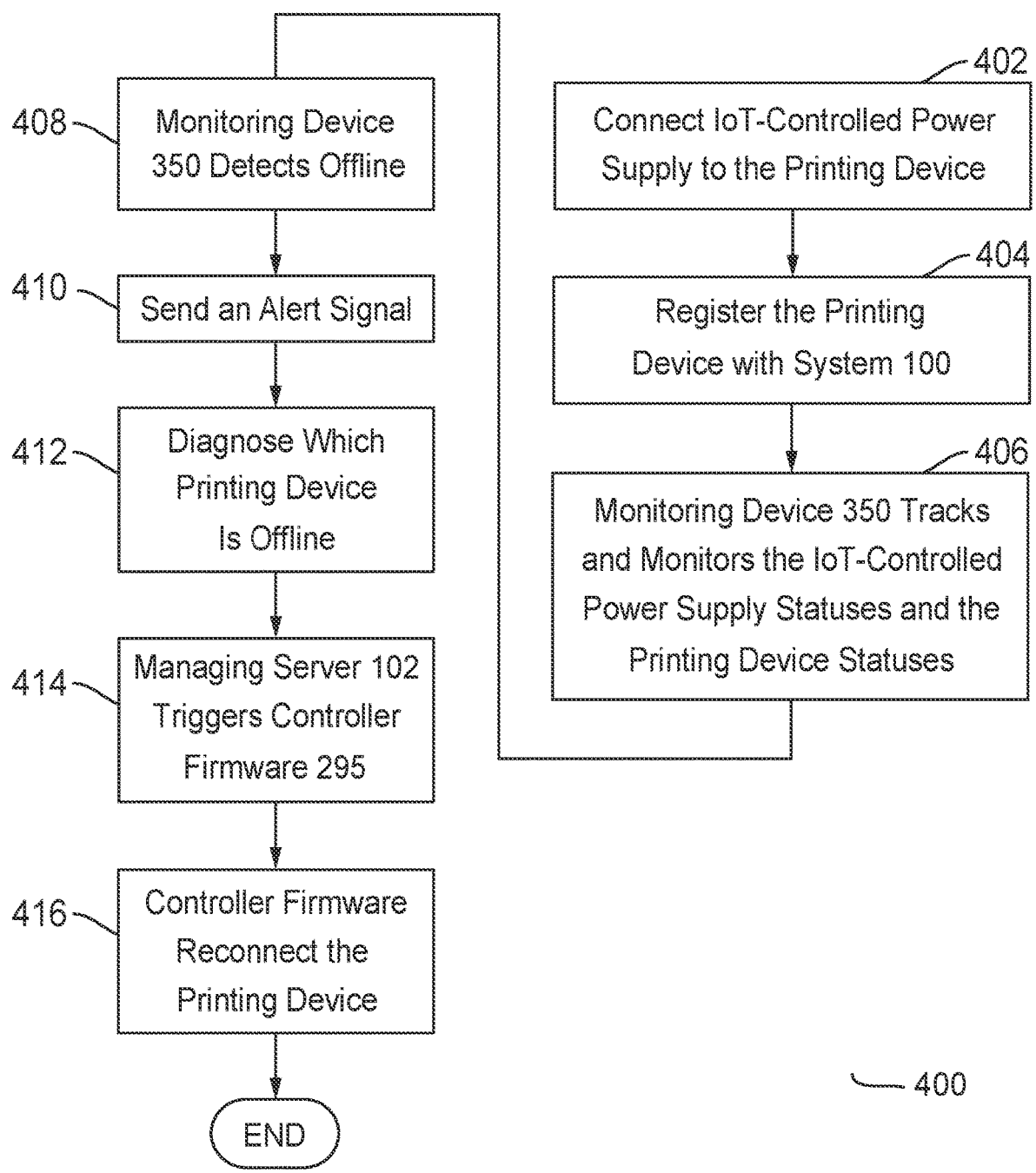
FIG. 4 illustrates a flowchart of monitoring a connection status between the printing devices and the managing server in accordance with the disclosed embodiments.

FIGS. 4-5 depict flowcharts for monitoring printing devices 104-116 and for re-connecting printing devices when the printing devices are offline in accordance with the disclosed embodiments. For the purpose of explanation, the disclosed embodiments adapts multiple functional printing system 100 as described in FIGS. 1-3 that includes a plurality of printing devices 104-116, managing server 102, and monitoring device 350. As mentioned before, managing server 102 is an internet/public cloud-based server that sends and receives data to/from printing devices 104-116 through a network.

FIG. 4 depicts a flowchart 400 for registering printing devices 104-116 to managing server 102 and monitoring the connection of printing devices 104-116 with managing sever 102. Step 402 executes by connecting printing devices 104-116 with IoT-controlled power supplies 334-342. Step 404 executes by printing devices 104-116 sending subscription requests to register to managing server 102. Next, step 406 executes by tracking and monitoring statuses of printing devices 104-116 and IoT-controlled power supplies 334-342. The monitoring step includes monitoring the connection between printing devices 104-116 and IoT-controlled power supplies 334-342 and connection between printing devices 104-116 and managing server 102. The tracking and monitoring is performed by monitoring device 350. Monitoring device 350 may be a separate device from managing server 102. Alternatively, monitoring device 350 may also be included in managing server 102. In this case, the tracking and monitoring is performed by managing server 102.

Step 408 executes by monitoring device 350 detecting an offline situation. Step 410 executes by monitoring device 350 sending an alert signal to managing server 412. In response, step 412 executes by diagnosing which printing device(s) is/are offline. After determining the offline printing devices, managing server 412 sends a trigger signal to printing devices 104-116 at 414 to trigger controller firmware 295 to re-connect printing devices 104-116 to managing server 102 at step 416. In accordance with the disclosed embodiments, a printing device is offline when managing server 102 is unable to reach the device, including the printing device's breakage and being powered off.

FIG. 5 depicts a flowchart 500 for re-connecting printing devices 104-116 to managing server 102 in accordance with the disclosed embodiments. Step 502 executes by monitoring device 350 monitoring statuses of printing device 104-116 and IoT-controlled power supplies 334-342. Step 504 executes by monitoring device 350 detecting an offline of one or more printing devices 104-110 and sends an alert signal to managing server 102. In reply, step 506 executes by managing sever 102 diagnoses printing devices 104-110 which printing device or printing devices is offline. In accordance with the disclosed embodiments, step 506 may also be executed by monitoring device 350 checking which printing device is offline before monitoring device 350 sends the notification to managing server 102.

After diagnosing the offline printing device, step 508 executes by managing server 102 recovering the offline printing device using controller firmware 259 of the offline printing device. After an attempt to recover the connection of the printing device, step 510 executes by checking if the printing device is still offline. If the answer is Yes (Y), flowchart goes to step 510. Otherwise, the printing device is back to online and the process goes to step 502 for continually monitoring the statuses of printing devices 104-116 and IoT-controlled power supplies 334-342. When there are more than one offline printing devices, process 500 checks if all the offline printing devices are back to online. If not all the offline printing devices are back to online, the process 500 goes to step 512. Further, the recovering step 508 may be executed several times (depending on rules stored in managing server 102) before process 500 goes to step 512.

Step 512 executes by managing server 102 or monitoring device 350 checking if the IoT-controlled power supply of the offline printing device is connected with the offline printing device. If the offline printing device is not back to offline, step 514 executes by checking if the IoT-controlled power supply is powered on. If the IoT-controlled power supply is powered on, step 516 executes by IoT controller 280 triggering a power cycle to turn on the IoT-controlled power supply. If the IoT-controller power supply is not powered on, the process goes to end. Step 518 executes by checking if the offline printing device is back online. If the answer is yes (Y), process 500 goes to step 502 for continuously monitoring the statuses of printing devices 103-116 and IoT-controlled power supplies 334-342. Otherwise, i.e., the answer of step 518 is no (N), the process may go to step 508 to retry connecting the offline printing device to managing server 102.

In accordance with the disclosed embodiments, the steps 508-518 may be repeated a number of times or until a determined period of time is collapsed. If the printing device is still offline after attempting the reconnection for the number of times, the process will end and a flag will be recorded in managing server 102. The disclosed embodiments may retry the connection process on a next day or after a predetermined period of time until the printing device is back online. Such retry attempt requirements and rules are determined based on the device information for each printing device stored in managing server 102.

The disclosed embodiments allows system 100 to remotely control and repair abnormality of a plurality of printing devices without human activities or sending a technician to an onsite location. This results in reduction of device downtime, increasing satisfaction and decreasing dealer's overall service cost.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more MFP systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A system for monitoring and controlling, via a network, at least one printing device, comprising:
    a server connecting wirelessly with at least one printing device to send/receive data to/from the at least one printing device, wherein the at least one printing device is equipped with an IoT-controlled power supply that is accessible by the server, and wherein the server is configured to recover a function of the at least one printing device when an offline situation occurs at the at least one printing device;
    a monitoring device for monitoring statuses of the server, the at least one printing device, and the IoT-controlled power supply, and for sending an alert signal to the server when an offline signal is detected;
    a diagnosing device for testing the server, the at least one printing device, and the IoT power supply to diagnose which printing device among the at least one printing device is offline; and
    a recovering device for re-connecting the offline printing device with either the IoT-controlled power supply or the server until the offline printing device is back online or until a predetermined condition is met.

2. The system of claim 1, wherein the predetermined condition includes a number of re-connecting attempts and a predetermined period of time required to reconnect the offline printing device with the server or the IoT-controlled power supply, and the time of day when the offline situation occurs.

3. The system of claim 1, wherein the recovering device uses a controller firmware to perform the re-connection, and wherein the controller firmware is installed at the at least one printing device by the server when the at least printing device is subscribed to the server.

4. The system of claim 3, wherein the controller firmware is used to auto-recover the connection between the offline printing device and the server upon receiving an instruction from the server.

5. The system of claim 1, wherein if the at least one printing device is offline, the recovering device re-connects the at least one printing device with the server, and if an offline printing device of the at least one printing device fails to change to an online status, the server checks a status of the IoT power supply of the offline printing device.

6. The system of claim 1, wherein the at least one printing device comprises an IoT controller that triggers a hardware power cycle (off-on) at a pre-determined time if the at least one printing device does not recover and a power is on.

7. A method for auto-reconnecting at least one printing device to a server when the at least one printing device is at an offline status, the method comprising:
monitoring the statuses of the at least one printing device, at least one IoT-controlled power supply, and the server, wherein the server connects wirelessly with the at least one printing device via a network and each of at least one printing device is equipped with an IoT-controlled power supply;
detecting an offline signal when the at least one printing device is offline, and sending the offline signal to the server;
diagnosing the server, the at least one printing device and the at least one IoT-controlled power supply to determine which of the least one printing device is offline; and
re-connecting the offline printing device to the server until the status of the offline printing device changes to an online status or if a certain condition is met.

8. The method of claim 7, wherein the re-connecting is executed by a controller firmware of the offline printing device, and wherein the controller firmware is installed to the at least one printing device by the server when the at least one printing device is subscribed to the server.

9. The method of claim 8, further comprising, if the offline printing device fails to change to an online status by the controller firmware after a number of attempts and a power is on, reconnecting the offline printing device by triggering a hardware power cycle (on/off) at a predetermined time.

10. The method of claim 7, wherein the monitoring step monitors the status of the server, a connection state of the at least one printing device with the at least one IoT-controlled power supply, and a power status of the at least one printing device with the at least one IoT-controlled power supply.

11. The method of claim 7, wherein the certain condition includes a predetermined number of re-connection attempts and a predetermined period of time required to reconnect with the server and the time of day when the offline occurs.

12. The method of claim 7, further comprising checking a status of the IoT power supply equipped by the offline printing device if the offline printing device fails to change to an online status after the re-connection step.

13. The method of claim 7, further comprising identifying which printing device fails to changes from an offline status to an online status after the reconnection step when there are more than one printing device are offline.

14. A server device for wirelessly auto-recovering, via a network, a multiple-functional printing system that includes a multiple printing devices, the device comprising:
a monitoring unit for monitoring statuses of the multiple printing devices and a multiple IoT-controlled power supplies and for sending an offline signal to the server device when an error signal is detected, wherein each of the multiple printing devices is equipped with an IoT-controlled power supply, and wherein the multiple printing devices are registered devices of the server device;
a diagnosing unit for testing the printing device and the IoT power supply to diagnose which printing devices are offline; and
a recovering unit for re-connecting the offline printing devices to the server until the error is solved or if a certain condition is met.

15. The server device of claim 14, wherein the error is solved if the offline statuses of the offline printing devices are changed to online statuses.

16. The server device of claim 14, wherein the certain condition includes a number of re-connection attempts and a predetermined period of time required to reconnect the server device with the printing device or the IoT power supply and the time of day when the offline situation occurs.

17. The server device of claim 14, wherein the recovering device uses a controller firmware installed in the offline printing devices to recover the connection, wherein the server device installs the controller firmware to each of the multiple printing devices when registered with the server device.

18. The server device of claim 14, wherein if one or more offline printing devices do not recover to online and a power is on, the recovering unit triggers a hardware power cycle (off-on) on the one or more offline printing devices at a predetermined time.

19. The server device of claim 18, wherein the recovering unit uses an IoT controller of the one or more offline printing devices to trigger the hardware power cycle.

20. The server device of claim 18, wherein the recovering unit performs the triggering operation upon receiving an instruction from the server device.

* * * * *